United States Patent
Mullinax, Sr.

[11] 3,901,109
[45] Aug. 26, 1975

[54] SAFETY END OF RUN FEEDER

[75] Inventor: Harold L. Mullinax, Sr., Morrow, Ga.

[73] Assignee: Owens-Illinois, Inc., Toledo, Ohio

[22] Filed: June 13, 1974

[21] Appl. No.: 478,954

Related U.S. Application Data
[62] Division of Ser. No. 370,333, June 15, 1973.

[52] U.S. Cl. .......... 83/5; 83/435; 83/477.2; 83/917; 93/58.2 R
[51] Int. Cl. .......................................... B26d 3/14
[58] Field of Search .......... 83/5, 435, 435.2, 477.2, 83/917; 93/58.2 R

[56] References Cited
UNITED STATES PATENTS

| | | | |
|---|---|---|---|
| 1,280,218 | 10/1918 | Hawthorne | 83/5 X |
| 1,870,630 | 8/1932 | Johnson | 83/435 |
| 2,581,049 | 1/1952 | Schempers | 83/5 X |
| 3,091,769 | 6/1963 | Bell et al. | 83/5 X |

Primary Examiner—Frank T. Yost
Attorney, Agent, or Firm—D. T. Innis; E. J. Holler

[57] ABSTRACT

Apparatus to advance a row of aligned, on edge, sheets past a table-mounted notching station without manual assistance. A chain-driven gauge in the form of one or more downwardly extending hooks is mounted in an overhead channel member. This member also serves as an alignment guide preventing vertical displacement of the row as it passes over the notching blade. The apparatus has particular usefulness in advancing the last part of a job run through the notching station in a semicontinuous operation where the row is normally fed upstream from the notching station by a reciprocating gauge. The device eliminates manually pushing the last portion of the row through the notcher station and the hazards attendant thereto.

1 Claim, 4 Drawing Figures

SAFETY END OF RUN FEEDER

This is a division of application Ser. No. 370,333 filed June 15, 1973.

BACKGROUND OF THE INVENTION

1. Field of the Invention

This invention relates generally to apparatus for advancing material past a cutting station, and, more particularly, for moving a row of aligned sheets past a table-mounted slotter saw, where the row is normally semi-continuously fed by a reciprocating back gauge such as that shown in U.S. Pat. No. 2,855,009 to McCormick at 32.

2. Description of the Prior Art

In the manufacture of corrugated paperboard container parts, many container assembly configurations require inserts with slots which are used to form partitions such as honeycomb structures within the container. In manufacturing these insert blanks, it is common in the art to use a table-mounted circular saw to cut the slots in the inserts. Normally, the inserts are aligned in a row or column and pushed past the saw blade while simultaneously being restrained on at least the top edge to prevent random motion while being pushed through the slotter station.

When automatic feeding of a continuous column of inserts is used, as shown in the above-named patent, a problem arises when, at the end of a run on one type of insert, the last portion of the column must be pushed past the slotter saw. Manual methods are hazardous, in that the high speed of the saw blades and lack of a solid row extending back to the automatic feed mechanism can result in a sharp kickback of any manual pusher device such as a pole or rod. More importantly, if the rod is misplaced and contacts the saw blade, a very definite threat of harm to the operator occurs.

SUMMARY OF THE INVENTION

Apparatus to advance a row or column of aligned sheet-like articles past a slotter saw using an overhead engaging means which is adapted to contact the last one of a column of sheets upstream from the saw and move that portion of the column or row downstream from the contacted sheet through the slotter saw without manual assistance.

DESCRIPTION OF THE PREFERRED EMBODIMENT

Figure 1:
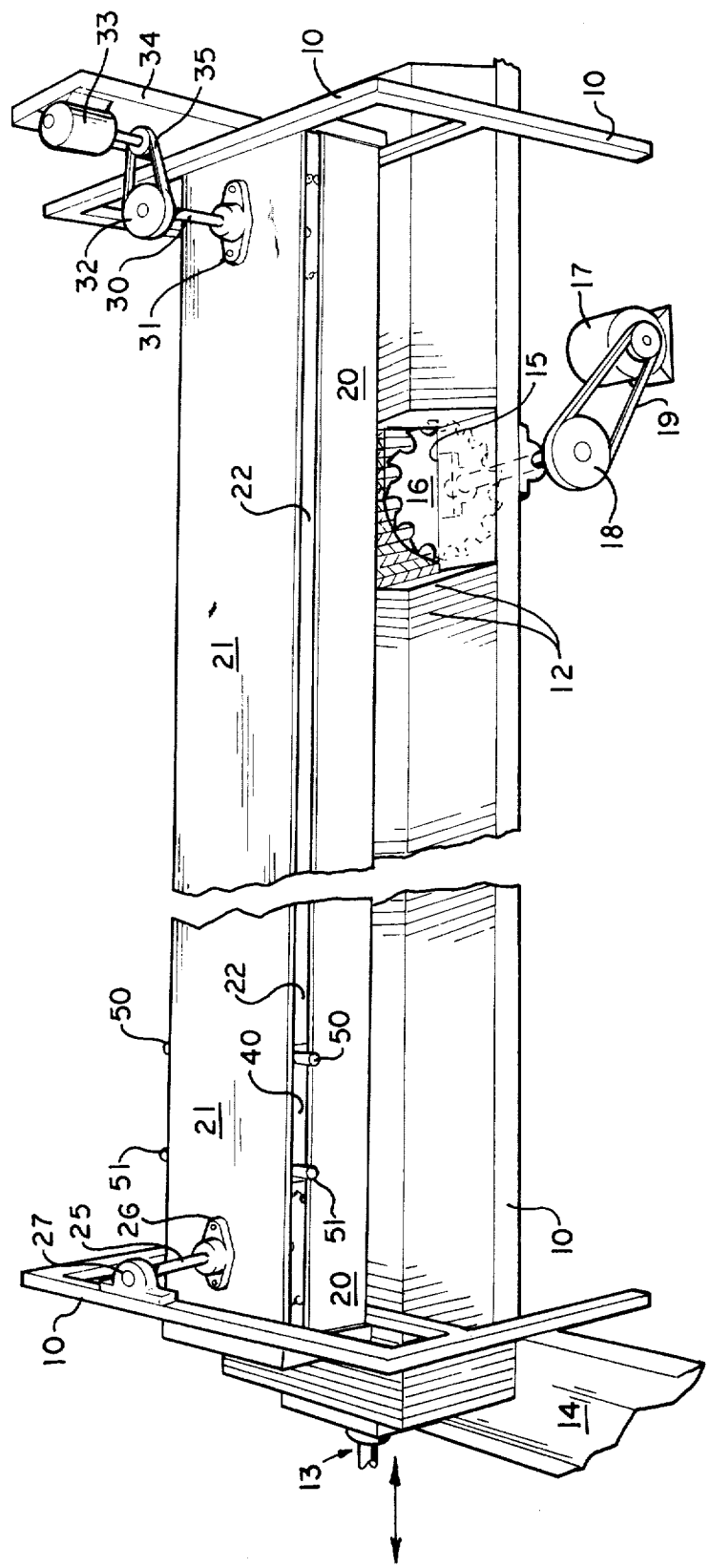
FIG. 1 is a perspective view, partly in section, of an apparatus embodying the present invention.

As shown in FIG. 1, a typical slotter station includes a frame 10 supporting a slide table 11 on which a plurality of paperboard sheets 12 are arranged on their edges in a row or column. The row of sheets 12 is slidable along the table 11. The length of the apparatus is, of course, variable.

As seen in FIG. 1, in normal operation, the apparatus is fed in a substantially continuous manner with a row of sheets 12, pushed along the slide table 11 by a reciprocating gauge 13. The gauge 13 is part of a cutting mechanism (not shown) described in U.S. Pat. No. 2,855,009. Sheet material is fed transversely into the cutting mechanism along a feeder table 14, and pushed by the reciprocating gauge 13 down the length of the slide table 11. In this manner, a solid row of sheets 12 is formed along the length of the table 11 and the row is advanced by the gauge 13. The row is moved along in an intermittent fashion as the gauge 13 is cycled. The term "continuous," as herein used to describe this part of the operation, really means continuously reciprocating.

A slot 15 is formed in the table 11, parallel to the direction of travel of the sheets 12. It should be noted that in FIGS. 1 and 2, the row of sheets 12 has been broken away to show the notching station. This slot 15 is adapted to be an opening for a circular saw blade 16. The saw blade 16 is mounted on a pulley and shaft assembly 18. The blade 16 is driven by a motor 17 and a drive belt 19. It should be understood that some installations may employ multiple saw blades to cut a plurality of spaced-apart slots in the sheets 12.

When in the normal mode of continuous operation, the row of sheets 12 is pushed by the reciprocating gauge 13 through the area of the slotter saw blade 16. It should be understood that the row of sheets 12 is pushed by the gauge 13, the gauge 13 then reciprocates backward, and a new group of sheets 12 are fed transversely onto the table 11 from the side-engaging slide table 14. The gauge 13 then moves forward to complete the cycle. Thus, the row of sheets 12 is advanced and fed from the upstream end.

Figure 2:
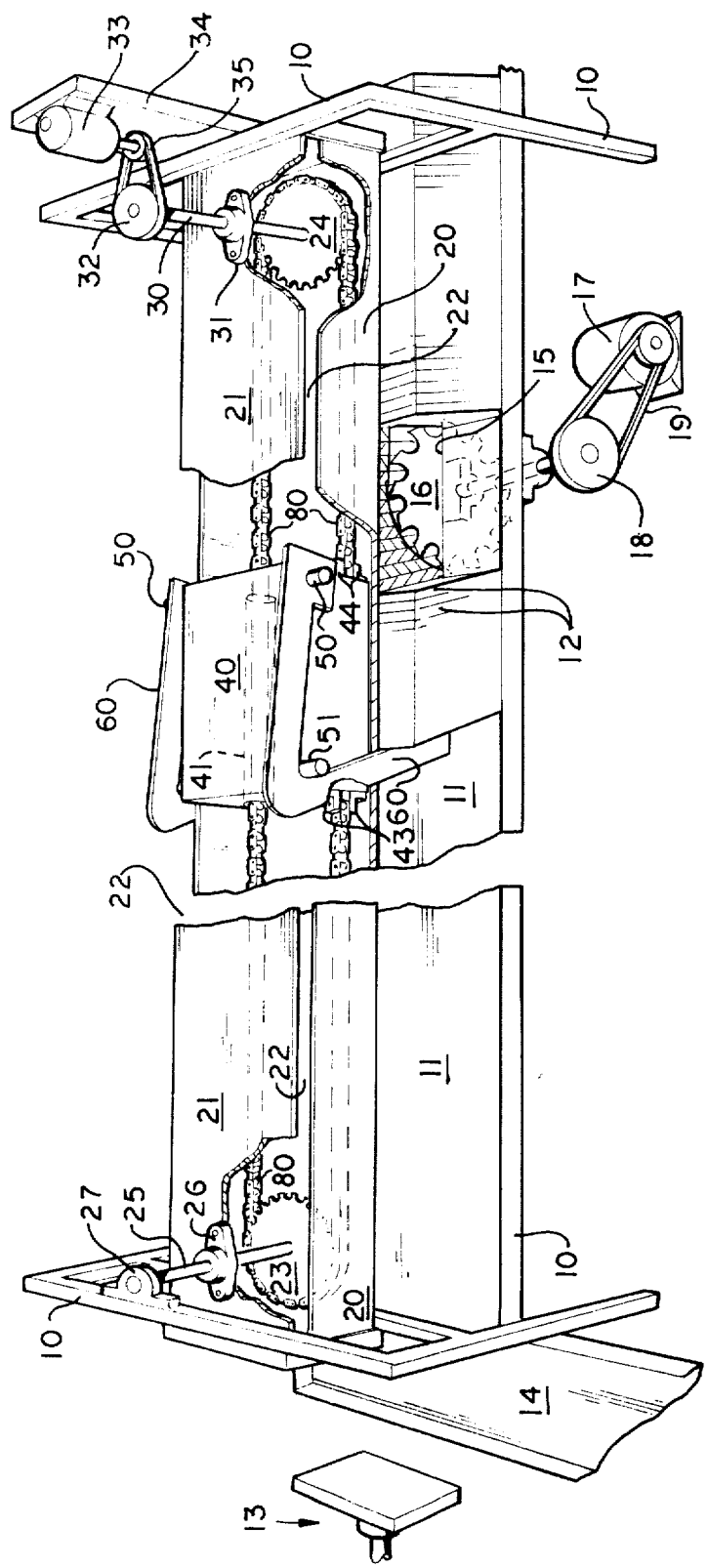
FIG. 2 is a perspective view, partly in section, of the apparatus in FIG. 1 showing the operation of the invention.
Figure 3:
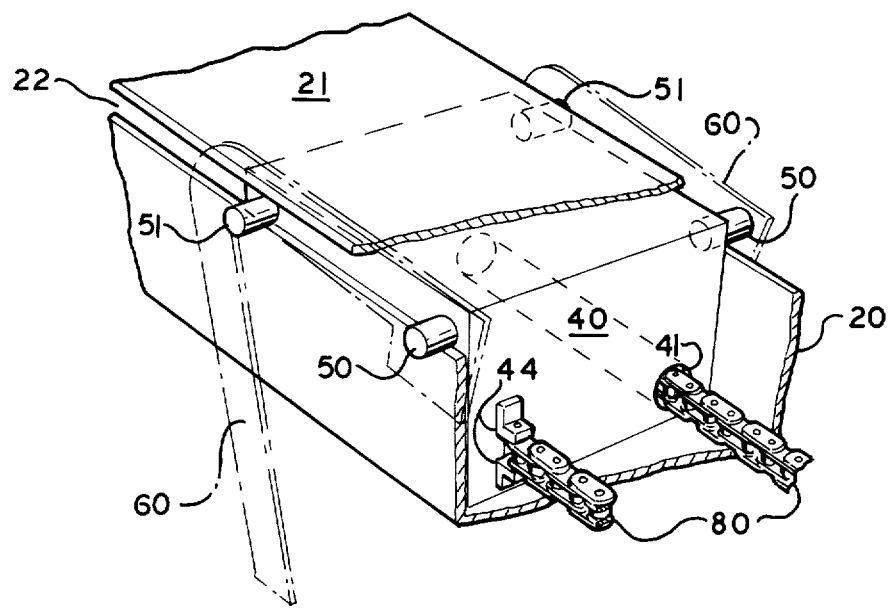
FIG. 3 is a perspective view of a portion of the apparatus of FIG. 1.

As seen in FIGS. 1, 2, and 3, an overhead restraining channel 20 extends the length of the apparatus and is supported by the frame 10. A coverplate 21 extends the length of the channel 20 and is also supported by the frame 10.

The coverplate 21 is vertically spaced from the channel 20, thus forming a slot or guideway 22 at each side of the channel 20 which extends substantially the length thereof.

As best seen in FIG. 2, the ends of the apparatus support sprocket wheels 23 and 24 respectively. Sprocket wheel 23 is rigidly attached to a vertical shaft 25 which is, in turn, mounted for rotation in a bearing mount 26 and a bearing mount 27. The bearing mount 26 is attached to the coverplate 21 and the bearing mount 27 is attached to the frame 10.

At the opposite end of the apparatus, sprocket wheel 24 is rigidly attached to a vertical shaft 30. The vertical shaft 30 is mounted for rotation in a bearing mount 31 attached to the coverplate 21. At the uppermost end of the shaft 30 is a pulley 32.

A motor 33 is attached to an extension 34 of the frame 10 and drives the pulley 32 and sprocket wheel 24 by a drive belt 35. In the preferred embodiment, the motor 33 is reversible.

A slide block 40 is seen best in both FIGS. 2 and 3. In FIG. 2, the coverplate 21 has been broken away to show the slide block 40. A hole 41 extends through one side of the block 40 at a position which is in the plane of the sprockets 23 and 24.

The hole 41 accommodates a carrier chain 30 which can slide through the hole 41. The chain extends around the sprocket wheels 23 and 24 and is rigidly attached to the block 40 by couplers 43 and 44. Coupler 43 may only be seen in FIG. 2.

Two pins, each shown as 50, extend outwardly from the sides nearest the leading or downward edge of slide block 40. Two similar pins shown as 51 extend outwardly from the sides of slide block 40 nearest the trailing edge of block 40. The pins 50 and 51 extend beyond the sides of the channel 20 and protrude through the guideways 22 on each side.

Figure 4:
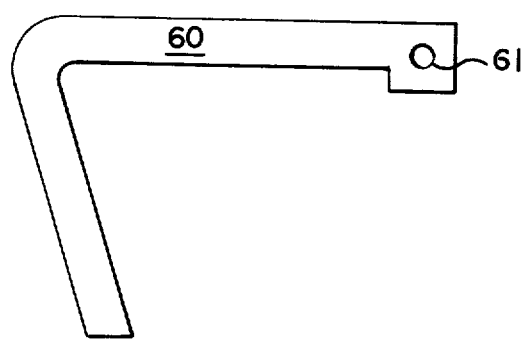
FIG. 4 is a side view of a portion of the apparatus shown in FIG. 1.

A pair of hooks 60, one of which is shown in FIG. 4, are used to contact the row of sheets 12 when the last of a run of one size of sheet 12 is reached. Each hook 60 has a hole 61 formed therein (shown only in FIG. 4), which fits over one of the pins 50. The rear portion of each hook 60 simply rests on the rear or trailing edge pin 51. The hooks 60 may be removed when not in use.

OPERATION OF THE PREFERRED EMBODIMENT

FIG. 1 shows the apparatus during normal, continuous operation. A full row of sheets 12 extend back to the area where the sheets 12 are loaded transversely from feeder table 14 in groups and advanced by the reciprocating gauge 13. The slotted sheets 12 are offloaded at the downstream end of the slide table 11.

As seen in FIG. 2, at the conclusion of a continuous run of groups of sheets 12 through the apparatus, the row is advanced manually to a point where the last sheet 12 in the row is between the sprocket wheel 23 and the saw blade 16. This may be done manually since the last sheet 12 will not be advanced into the vicinity of the blade 16.

The slide block 40 is then positioned over the last part of the row of sheets 12. The two hooks 60 are attached to the pins 50 on the sides of the slide block 40 and set in position to contact the rearward face of the last sheet 12 in the row. This is the position of the apparatus in FIG. 2. The motor 33 is then used to turn the pulley 32 and sprocket wheel 24 which advances the slide block 40 through the action of the carrier chain 80.

The slide block 40 and the hooks 60 attached thereto pull the row of sheets 12 through the area of the slotter saw blade 16 and beyond, after which the slotted sheets 12 are removed. The motor 33 is then reversed and moves the slide block 40 back upstream to be in position for the conclusion of the subsequent job run.

I claim:
1. The method of advancing a complete column of similar sheet-like articles, arranged on their edges in face-to-face relationship, to and through a table-mounted slotter station comprising the steps of:
   a. engaging the last article in said column upstream from said slotter station by a pair of spaced-apart downwardly directed members;
   b. pulling said members in unison toward said slotter station;
   c. continuing the pulling movement of said members to the extent that all of said articles are moved through said slotter station; and returning said members to their initial position preparatory to repeating the cycle on the next end-of-run of a supply of articles.

* * * * *